Jan. 24, 1939.   O. E. STOESSEL   2,144,668
REGULATING SYSTEM
Filed July 25, 1935
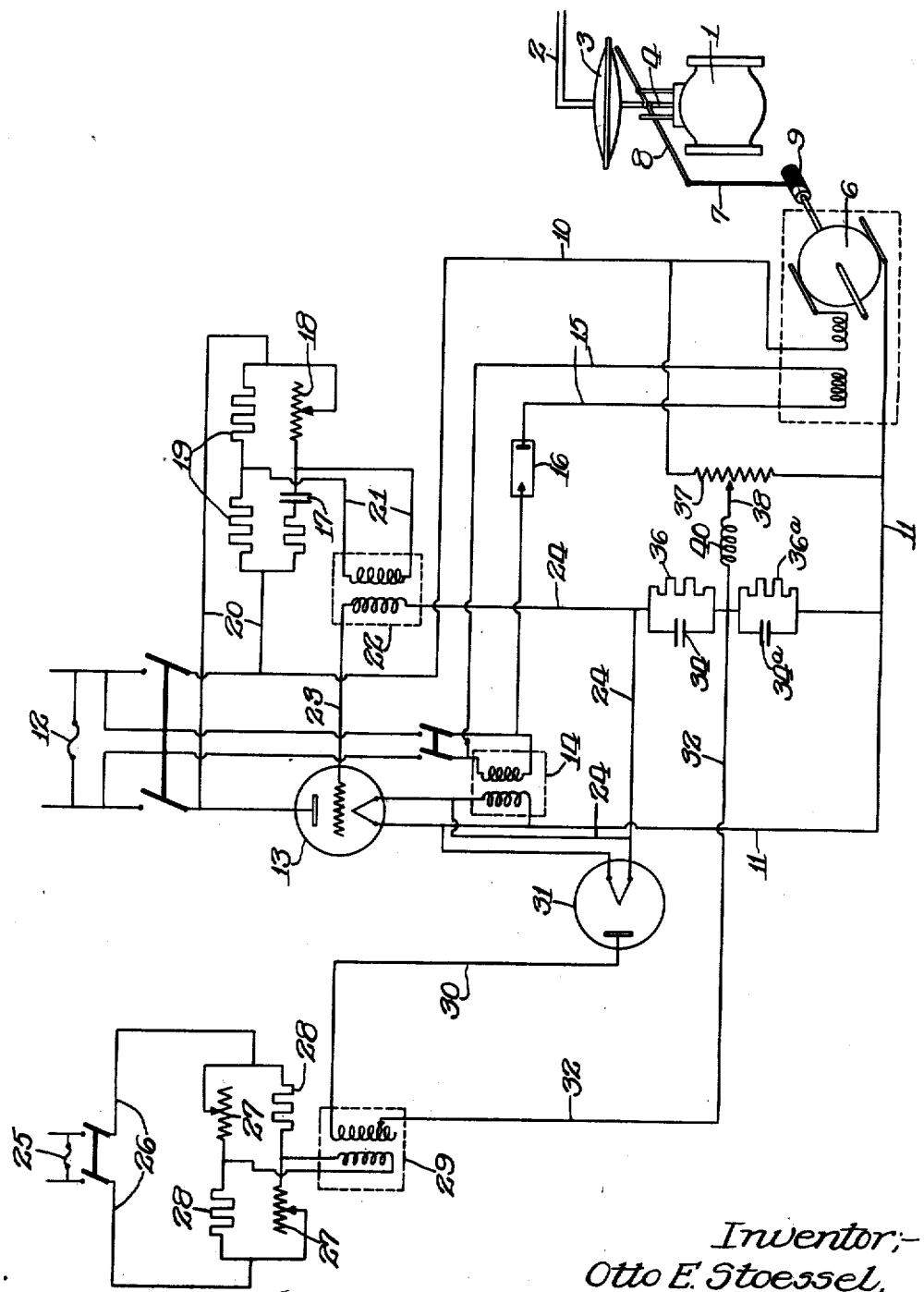
Inventor:-
Otto E. Stoessel,
By Davis, Macauley, May, Lindsey & Smith Attys.

Patented Jan. 24, 1939

2,144,668

UNITED STATES PATENT OFFICE 2,144,668

REGULATING SYSTEM

Otto E. Stoessel, Chicago, Ill.

Application July 25, 1935, Serial No. 33,069

12 Claims. (Cl. 236—78)

This invention relates to a regulating system for controlling various devices such as motors and is particularly well adaptable for use in controlling fluid supply lines.

While adaptable to many applications, the invention is shown, for illustrative purposes only, as applied to a heating system, although the problems involved are similar to those involved in many other systems requiring close regulation.

It is customary at present to regulate the supply of heated medium, energy, or fuel to a furnace in heating systems, by intermittently but completely interrupting the flow of heat, fuels, or energy. This produces what may be termed "hunting", which prevents close regulation. In other words, by such an intermittent control or regulation involving a complete cut-off the temperature of a room being controlled, for example, is permitted to rise and/or fall considerably above or below the desired temperature before the regulation becomes effective. Expressed differently, by the usual intermittent method heretofore employed, an undesired temperature condition of a room or rooms will exist for an appreciable time before correction is instigated and then an over-correction is made.

In accordance with my invention, I provide a continuous variable control, as distinguished from an intermittent cut-off control. That is, my system continuously regulates the supply valve, for instance, by continuously varying the supply by small increments and in immediate response to a combination of conditions in such a manner that the system is not only immediately responsive to changes in the temperature of a room or rooms being heated, but anticipates coming changes by outside atmospheric conditions.

More specifically, I continuously regulate the device to be controlled, such as a valve, by means of a torque motor operating against a countereffective force, and control the torque motor by means of a grid control mercury vapor arc rectifier tube, such as a "thyratron" which in turn is controlled in accordance with predetermined conditions and variations therefrom. I make use of the ability of this type of tube to handle and control the flow of a comparatively large amount of power in the plate circuit in a predetermined manner with the expenditure of a comparatively small amount of power in the grid circuit. The tube is inserted in the torque motor circuit to control the latter and the output of the tube is preferably controlled by the so-called "phase shift method". In this method of tube control the load circuit or output of the tube is controlled by varying the conductive period by varying the phase of the grid voltage relatively to the plate or line voltage. The grid of the tube is in turn controlled by one or more control or steering circuits embodying one or more bridge circuits having therein temperature, wind-direction and velocity, and/or humidity-responsive devices. In the preferred embodiment of my invention, the phase and voltage of the grid voltage is not only varied to control the output of the tube, but the action of the tube is stabilized by controlling the amplitude of the impressed grid voltage by a counter-electromotive force derived from the torque motor. The torque of the motor thus becomes a function of the output of the tube, which in turn is controlled by the grid circuit.

A more detailed description of my regulating system will now be given in connection with the drawing, in which the single figure is an electric circuit diagram of one embodiment of my invention.

My invention is illustrated as applied to controlling a heating system by means of regulating a valve 1, which is constantly biased or urged in either open or closed direction by the pressure or partial vacuum in line 2 acting upon a diaphragm 3 connected to the valve stem 4. A torque motor 6 is used to regulate the degree of opening of the valve through a cable 7, one end of which is fastened to a lever 8 connected to the valve stem, and the other end of which is wrapped around a spool or drum 9 secured to the shaft of the motor. The illustrated motor 6 is a compound wound motor, the armature and series field of which is connected by a pair of conductors 10 and 11 through a suitable switch to a source of alternating current 12, the conductor 11 including a mercury vapor arc rectifier 13 which may be a "thyratron" tube or equivalent. The same alternating current source is also utilized to heat the filament of the "thyratron" through a transformer 14. The shunt winding of the motor, when a shunt winding is used, is fed through a pair of conductors 15, one of which includes any suitable rectifier 16 connected to the same alternating current source 12 through a suitable switch. The type of motor used will of course depend upon the type of load to be counterbalanced, i. e., a spring, weight or diaphragm. The size of the motor may be relatively small since it need only be capable of overcoming frictional losses in the transmission between the motor and valve. The transmission ratio can of course be selected so that a low rating motor can perform the work.

The grid voltage of the tube 13 is caused to be approximately 100 degrees out of phase with the output of the tube or line voltage by means of a phase shifting bridge circuit comprising a condenser 17 and a variable resistance 18 arranged as two arms of a Wheatstone bridge. The other two arms of the bridge comprise fixed resistances 19. The phase angle of the grid voltage may of course be varied by adjusting the variable resistance 18. The bridge is energized from the same alternating current source 12 through conductors 20. The voltage obtained across the bridge is applied to the grid by conductors 21 leading to the primary of a grid transformer 22, the secondary of which is connected at one end to the grid of the tube 13 by a conductor 23, and at the other end to the filament by a conductor 24. In some installations where a simpler system is desired than the complete illustrated system, the resistances 19 may be temperature, wind, or humidity responsive resistances placed in and/or exterior of the rooms or building to be regulated.

The amplitude of the grid voltage in the illustrated system is controlled by what may be termed a control or steering circuit which comprises two parts, another controlling bridge circuit and a governing or balancing circuit. The controlling bridge circuit is energized from any suitable source of alternating current 25, through conductors 26. The four arms of the controlling bridge circuit may comprise automatic variable resistances such as temperature-responsive resistances 27 and wind-responsive resistances 28, the former of which may be located, for example, in the interior of the building or rooms in which the temperature is being regulated, exteriorly of the building, and/or in the exhaust air duct of the building, whereas the wind-responsive resistances may be placed exteriorly of the building and subject to wind direction, while another may be responsive to wind velocity. If desired, humidity-responsive devices may also be used.

The voltage across the controlling bridge is applied to the grid circuit by being connected across the primary of the control or steering transformer 29, the secondary of which is connected at one end to the filament end of the grid circuit by a conductor 30 which includes a suitable rectifying tube 31, to provide a direct current potential, and which is connected to the filament of tube 13 through the conductor 24. The filament of the rectifier 31 may be supplied from the filament transformer 14 and the tube is arranged with its filament side connected to the grid transformer. The other end of the secondary of transformer 29 is connected to the grid of tube 13 by a conductor 32 which connects to conductor 24 at a point removed from the filament through a filter or equalizer comprising a condenser 34 and resistance 35.

To assure stability of the positive voltage impressed upon the grid of the tube by the control bridge circuit, this voltage is partially counterbalanced by a governing negative voltage supplied by the governing or balancing circuit. This negative voltage is obtained from the back E. M. F. of the torque motor by tapping a high resistance 37 connected across the motor and conducting the potential thus derived to the control circuit by a conductor 38 which includes a choke coil 40 and connects with conductor 32, and with conductor 11 which connects to the filament of tube 31 through the filament connections. The counter grid voltage is filtered by a filtering condenser 34ª and resistance 36ª to smooth out the impressed counter grid potential. Thus an increasing grid voltage from the controlling bridge tends to elevate the axis of the grid voltage into the critical voltage of the tube which tends to increase the tube output. The counter voltage from the governing circuit which latter voltage varies in accordance with the torque of the motor tends to depress the axis of the grid voltage and thereby governs and stabilizes the system.

From the foregoing description, it will be apparent that the illustrated system may be used to regulate a motor controlled steam pressure valve and thereby the amount of heat distributed by a heating system. The torque of the motor 6 continuously counteracts the pressure or the vacuum in the steam line and gives an unlimited, variable control of the valve opening or position, which control is constant rather than intermittent. The combined effects of the temperature and wind-responsive devices in the control or steering circuit make it possible to not only control the supply of steam by actual conditions in the building which is being controlled, but permits anticipation of changing atmospheric conditions due to change in wind velocity, wind direction and outside temperature. By this means the supply of steam can be varied by small increments in anticipation of a change about to take place. This is much more satisfactory than waiting for a change to actually take place in the building and then varying the supply of heat far in excess of what is needed by an over-correction in either direction.

The counterbalancing and governing effect of the counter E. M. F. of the motor or the positive grid potential impressed upon the grid by the steering circuit, together with the close regulation made possible by the steering transformer, grid transformer and bridge circuits, results in a closely regulatable and stable system which requires very little operating power because of the circuit arrangement and small motor that is usable.

It will be obvious to those skilled in the art that the motor controlled by my system may be used for any desired purpose and that the valve 1 may be a damper in the flue duct of a furnace, the fuel supply line to the furnace, and/or the air supply in a humidifying system. It will also be apparent to those skilled in the art that minor changes may be made in the illustrated embodiment of this invention without departing from the spirit and scope of the invention as defined in the appended claims.

I claim:

1. A fluid regulating system comprising the combination of a supply valve and means normally tending to move the valve to one extreme position with a torque motor tending when energized to move the valve to its other extreme position, a source of current supply for said motor, a grid controlled ionic tube in said supply circuit, a phase shifting circuit connected to the grid of said tube, a controlling circuit, having an automatically variable resistance therein, connected to said grid, and connections for impressing a counter E. M. F. from said motor upon said grid through said grid transformer.

2. A fluid regulating system comprising the combination of a supply valve and means normally tending to move the valve to one extreme position with a torque motor tending when energized to move the valve to its other extreme position, a source of current supply for said motor, a grid controlled ionic tube in said supply circuit, a phase shifting circuit connected to the grid of said tube, a controlling circuit, having an automatically variable resistance therein, a control transformer connecting said latter circuit to said grid, and connections for impressing a counter E. M. F. from said motor upon said grid through said grid transformer.

3. A fluid regulating system comprising the combination of a supply valve and means normally tending to move the valve to one extreme position with a torque motor tending when energized to move the valve to its other extreme position, a source of current supply for said motor, a grid controlled ionic tube in said supply circuit, a phase shifting circuit, a grid transformer connecting said latter circuit to the grid of said tube, a controlling circuit, having an automatically variable resistance therein, a control transformer connecting said latter circuit to said grid transformer, and connections for impressing a counter E. M. F. from said motor upon said grid through said grid transformer.

4. A fluid regulating system comprising the combination of a supply valve and means normally tending to move the valve to one extreme position with a torque motor tending when energized to move the valve to its other extreme position, a source of current supply for said motor, a grid controlled ionic tube in said supply circuit, a phase shifting circuit, a grid transformer connecting said circuit to the grid of said tube, a controlling circuit having an automatically variable resistance therein, a control transformer connecting said latter circuit to said grid transformer, and connections for impressing a counter E. M. F. from said motor upon said grid through said grid transformer.

5. A fluid regulating system comprising the combination of a supply valve and means normally moving the valve to one extreme position, with a torque motor tending, when energized, to move the valve to its other extreme position, a source of current supply for said motor, a grid controlled ionic tube in said circuit, a phase shifting circuit connected to the grid of said tube, and a controlling circuit, having an automatically variable resistance therein, connected to said grid, said latter circuit also having means for supplying a pulsating direct current to said grid.

6. A fluid regulating system comprising the combination of a supply valve and means normally moving the valve to one extreme position, with a torque motor tending, when energized, to move the valve to its other extreme position, a source of current supply for said motor, a grid controlled ionic tube in said circuit, a phase shifting circuit, a grid transformer connecting said latter circuit to the grid of said tube, and a controlling circuit, having an automatically variable resistance therein, connected to said grid transformer, said latter circuit also having means for supplying a pulsating direct current to said grid.

7. A fluid regulating system comprising the combination of a supply valve and means for moving the valve to one extreme position, with a torque motor tending, when energized, to move the valve to its other extreme position, a source of current supply for said motor, a grid controlled ionic tube in said circuit, a phase shifting circuit, a grid transformer connecting said latter circuit to the grid of said tube, a controlling circuit, having an automatically variable resistance therein, a control transformer connecting said latter bridge circuit to said grid transformer, and connections for impressing a counter E. M. F. from said motor upon said grid through said grid transformer.

8. A fluid regulating system comprising the combination of a supply valve and means normally tending to move the valve to one extreme position with a torque motor tending when energized to move the valve to its other extreme position, means for supplying current to said motor, a grid controlled ionic tube in said supply circuit for controlling the current supplied to said motor, means for shifting the phase of the grid voltage relative to the plate voltage, means for impressing a variable direct current voltage upon said grid to vary the axis of the grid voltage, and means for impressing a voltage upon the grid of opposite sign to said last mentioned voltage and variable in accordance with the torque of the motor.

9. A fluid regulating system comprising the combination of a supply valve with a torque motor adapted to operate said valve and tending when energized to rotate in one direction, means normally tending to rotate said motor in the opposite direction, a source of current supply for said motor, a grid controlled ionic tube in said supply circuit, a phase shifting circuit connected to the grid of said tube, and a controlling circuit having an automatically variable resistance therein connected to said grid, said latter circuit also having means for supplying a pulsating direct current to said grid.

10. A fluid regulating system comprising the combination of a supply valve with a torque motor adapted to operate said valve, means normally operative to rotate said motor in one direction, and electrical means tending to rotate said motor in the opposite direction, said electrical means comprising a source of current supply for said motor, a grid controlled ionic tube in said supply circuit, a phase shifting circuit connected to the grid of said tube, a control circuit connected to said grid and having means for applying a pulsating direct current to said grid, and an automatically variable resistance in said latter circuit adapted to be controlled by means exterior of said system.

11. A fluid regulating system comprising the combination of a supply valve with a torque motor, mechanical means normally operative to rotate said motor in one direction, and electrical means tending to rotate said motor in the opposite direction, said electrical means comprising a source of current supply for said motor, a grid controlled ionic tube in said supply circuit, a phase shifting bridge circuit connected to the grid of said tube, a control circuit connected to said grid and having means for applying a pulsating direct current to said grid, and an automatically variable resistance in said latter circuit adapted to be controlled by means exterior of said system.

12. A fluid regulating system comprising the combination of a supply valve with a torque motor connected thereto and adapted to operate said valve, means normally operative to rotate said motor in one direction, and electrical means tending to rotate said motor in the opposite direction, said electrical means comprising a supply circuit for said motor, a grid controlled ionic tube in said supply circuit for controlling the latter, a phase shifting circuit connected to the grid of said tube, and a control circuit connected to said grid, having an automatically variable resistance therein adapted to be controlled by means exterior of the system.

OTTO E. STOESSEL.

CERTIFICATE OF CORRECTION.

Patent No. 2,144,668. January 24, 1939.

OTTO E. STOESSEL.

It is hereby certified that error appears in the printed specification of the above numbered patent requiring correction as follows: Page 3, first column, line 69, claim 7, strike out the word "bridge"; and that the said Letters Patent should be read with this correction therein that the same may conform to the record of the case in the Patent Office.

Signed and sealed this 21st day of March, A. D. 1939.

Henry Van Arsdale.

(Seal)

Acting Commissioner of Patents.